United States Patent [19]

Minami et al.

[11] 3,988,281

[45] Oct. 26, 1976

[54] WATER-DISPERSIBLE THERMOSETTING COATING COMPOSITION

[75] Inventors: Giichi Minami, Kobe; Yukihiro Manabe, Amagasaki; Yasuo Suematsu, Itami, all of Japan

[73] Assignee: Shinto Paint Co., Ltd., Amagasaki, Japan

[22] Filed: Jan. 23, 1975

[21] Appl. No.: 543,477

Related U.S. Application Data

[63] Continuation-in-part of Ser. No. 358,929, May 10, 1973, abandoned.

[30] Foreign Application Priority Data

May 19, 1972  Japan.............................. 47-49593

[52] U.S. Cl................. 260/29.6 TA; 260/29.2 UA; 260/29.6 R; 260/29.6 H; 260/29.6 HN; 260/29.6 N; 526/16; 526/13; 526/49; 526/50
[51] Int. Cl.$^2$.................. C08G 59/50; C08L 63/00
[58] Field of Search............... 260/29.2 UA, 29.6 R, 260/29.6 N, 29.6 TA, 29.6 H, 29.6 HN, 86.1 N

[56] References Cited
UNITED STATES PATENTS

| | | | |
|---|---|---|---|
| 3,455,806 | 7/1969 | Spoor et al.................. | 260/29.6 TA |
| 3,471,388 | 10/1969 | Koral........................... | 260/29.6 TA |
| 3,575,909 | 4/1971 | Gilchrist...................... | 260/29.6 TA |
| 3,598,774 | 8/1971 | Hartzell et al............... | 260/29.6 TA |
| 3,652,478 | 3/1972 | Ishii et al..................... | 260/29.6 TA |
| 3,697,467 | 10/1972 | Haughney.................... | 260/29.6 TA |
| 3,703,596 | 11/1972 | Marx et al................... | 260/29.6 TA |

*Primary Examiner*—Lucille M. Phynes
*Attorney, Agent, or Firm*—Armstrong, Nikaido & Wegner

[57] ABSTRACT

An aqueous thermosetting coating composition suitable for electrodeposition onto the surface of an article used as a cathode. The coating composition is an aqueous solution or dispersion of a resinous material and an organic and/or inorganic acid the resinous material being prepared by reacting (i) a secondary amine with (ii) epoxy groups pendant from a main chain of a copolymer of 5–50% by weight of an ethylenically unsaturated monomer containing epoxy groups and 50–95% by weight of one or more of vinyl or acrylic unsaturated monomers which do not contain epoxy groups and which are copolymerizable with the ethylenically unsaturated monomer. The secondary amine is employed in an amount of 0.1 – 0.8 equivalent per 1 equivalent of epoxy groups contained in said copolymer.

5 Claims, No Drawings

WATER-DISPERSIBLE THERMOSETTING COATING COMPOSITION

This application is a continuation-in-part of U.S. Patent application Ser. No. 358,929 now abandoned, filed May 10, 1973.

This invention relates to a water-dispersible thermosetting coating composition and particularly to a water-dispersible thermosetting coating composition suitable for electrodeposition coating method wherein a coating film is deposited onto the surface of an article used as the cathode.

In the electrodeposition coating method it is well known to use a water-dispersible coating composition which is used in the form of an aqueous solution or dispersion as a bath for the electrodeposition.

However most of the conventional coating compositions used in such case electrodeposition method are those in which the resin as a main film-forming component has carboxyl groups. Therefore the resin is present in the form of anions in water and, when it is placed in an electric field, it will migrate toward and deposited on the anode.

One of the problems encountered in such conventional type of electrodeposition coating is that, as a metal object to be coated is used as an anode, the metal or pretreated surface pretreating layer forming the surface of the object to be coated will be dissolved in the electrodeposition bath so that the surface of the object will tend to be eroded. For example, in case the object to be coated is an iron product, the iron will be dissolved out, will be contained as an oxide in the electrodeposited coating film, causing undesirable coloration of the coated resin film. When the object has a phosphate-conversion coating, a part of the coating will be also dissolved during the electrodeposition and the corrosion-resistance inherently owned by the phosphate film may be reduced. Particularly, in case the object to be coated is a chromium-plated product and is to be finished by being coated with a transparent or clear coating film, the chromium-plated layer will be corroded during the electrodeposition process. Therefore the surface gloss will be reduced and the appearance will be impaired.

Such disadvantages of the conventional electrodeposition method can be overcome by conducting a cathodic electrodeposition wherein an object to be coated is used as the cathode. However, in order to effect such cathodic electrodeposition, there must be used a resin (a main film-forming component) which, when dispersed or dissolved in water, acts as cations so that it will migrate toward the cathode so as to be deposited on the cathode (object to be coated) when placed in an electric field. In order to prepare a coating composition having such property, basic groups may be contained as chemically bonded in a resin. When the resin is dissolved or dispersed in an acidic aqueous medium the basic groups are dissociated into cations. For this purpose, there have been prepared various coating compositions suitable for such cathodic electrodeposition. However conventional coating compositions of this kind are insufficient in curing so that it is difficult to form a coating film fully satisfactory in the properties or performance.

Therefore it is an object of this invention to provide a coating composition which is useful not only as an ordinary paint but also for cathodic-electrodeposition coating and can be satisfactorily cured under practical conditions.

The present invention provides water-dispersible thermosetting coating composition which comprises an aqueous solution or dispersion of a resinous material and an organic and/or inorganic acid, said resinous material being prepared by reacting a secondary amine with epoxy group pendant from a main chain of a copolymer of 5–50% by weight of an ethylenically unsaturated monomer containing epoxy group and 50–95% by weight of one or more of vinyl or acrylic unsaturated monomers which do not contain epoxy groups and which are copolymerizable with the epoxy group-containing ethylenically unsaturated monomer, the amount of the secondary amine being 0.1–0.8 equivalent per equivalent of the epoxy groups contained in said copolymer.

The resinous material in this composition contains three important functional groups. The first is the tertiary amine group, which is derived by reacting a part of the epoxy group originally present in the copolymer with a secondary amine. It can form a cationic group in water and makes the resinous material water-soluble or dispersible, with the aid of an acid. The second is the hydroxyl group adjacent to the tertiary amine group, which is produced in the course of the tertiary amine-forming reaction stated above, and the last is the residual epoxy group. These two react mutually at elevated temperature in the presence of a tertiary amine as a catalyst, and make the resinous material cross-linked.

Thus, when dissolved or dispersed in water the resinous material in the coating composition of this invention is in the form of cations so that upon passage of an electric current, it will migrate toward the cathode and will be deposited on the cathode. Further, the coating film obtained from the coating composition of the present invention will be cross-linked and cured when heated at 140° to 200° C. for 20 to 60 minutes. The resulting film is light in the color and excellent in the gloss and has excellent mechanical properties and chemical resistance.

One of the monomers for producing the copolymer which is the most important basic component of the composition of the present invention is an ethylenically unsaturated monomer containing an epoxy group. It is, for example, glycidyl acrylate, glycidyl methacrylate, allylglycidyl ether, N-glycidyl acrylamide or vinylcyclohexene monoepoxide. In consideration of the copolymerization reactivity with the other comonomer and commercial availability, glycidyl methacrylate is most preferable is preferable to use. The amount of use of such epoxy group-containing ethylenically unsaturated monomer is preferably 5 to 50% by weight on the copolymer. When it is less than 5%, no satisfactory water-dispersibility and curability will be able to be given. When it exceeds 50%, it will be difficult to balance the various properties of the resulting film. Further, a large amount of use of an expensive monomer is not preferable because of economy.

Examples of the vinyl or acrylic unsaturated monomer containing no epoxy group and copolymerizable with the above mentioned epoxy component are styrene, substituted styrenes such as vinyl toluene, chlorostyrenes, α-methyl styrene, and dimethyl styrene, vinyl esters of alkanoic acid containing 2–18 carbon atoms such as vinyl acetate, vinyl propionate, vinyl pivalate, vinyl stearate, and vinyl versatate, acrylonitrile, methacrylonitrile, 1–18 carbon atoms-containing alkenyl acrylate and methacrylate such as methyl acrylate, methyl methacrylate, ethyl acrylate, ethyl methacrylate, butyl acrylate, n-butyl methacrylate, isobutyl methacrylate, tert.-butyl methacrylate, 2-ethylhexyl acrylate, 2-ethylhexyl methacrylate, lauryl methacrylate, stearyl methacrylate, cyclohexyl methacrylate, and benzyl methacrylate, 2-4 carbon atoms-containing hydroxyalkyl acrylate and methacrylate such as 2-hydroxyethyl acrylate, 2-hydroxyethyl methacrylate, 2-hydroxypropyl acrylate, 2-hydroxypropyl methacrylate, 2-hydroxybutyl methacrylate, and 4-hydroxybutyl methacrylate, and dialkyl esters of $\alpha,\beta$-unsaturated dicarboxylic acid such as dimethyl, diethyl, and dibutyl maleate, fumalate and itaconate. A monomer having a functional group high in the reactivity with epoxy group, such as unsaturated carboxylic acid or its anhydride, e.g. acrylic acid, methacrylic acid or maleic anhydride or N-methylol acrylamide causes gelling by cross-linking during the copolymerizing reaction and therefore cannot be used. The particular monomer to be used and the proportion of its use in the copolymerization are determined by the properties desired for the coating film.

The copolymer can be produced by any generally known method. However, it is convenient to conduct a radical polymerization by using a radical producing polymerization initiator in an organic solvent. The solvent to be used, for the necessity of dissolving or dispersing the produced polymer in water later, is preferable to be one which is miscible with water. As such solvents, there can be enumerated lower alcohols such as ethanol, isopropyl alcohol and tertiary butyl alcohol, glycol ethers such as ethylene glycol monomethyl ether, ethylene glycol monoethyl ether, ethylene glycol monobutyl ether and diethylene glycol monoethyl ether, acetone and diacetone alcohol.

For the radical producing polymerization initiator, there can be used peroxides such as benzoyl peroxide or cumen hydroperoxide. However, as it is likely to be colored when the copolymer is reacted with amine later, it is preferable to use an azo compound such as azobisisobutylonitrile.

As examples of the secondary amine to be reacted on the epoxy groups suspended from the main chain of the copolymer, there can be enumerated lower dialkyl amines such as dimethylamine, diethylamine and di-n-propylamine, dialkanolamines and N-alkylalkanolamines such as diethanolamine, diisopropanolamine and N-methylethanolamine and cyclic secondary amines such as piperidine, morpholine and N-methyl piperazine. In respect of the dispersibility in water, alkanolamines are high in the effect with a comparatively small amount and are therefore advantageous. The proper amount of the amine to be used is from 0.1 to 0.8, preferably from 0.1 to 0.6 equivalent per 1 equivalent of the epoxy group in the copolymer. If it is less than 0.1 equivalent no sufficient water-dispersibility of the resulting resin will be obtained. When it is more than 0.8 equivalent, the amount of the residual unreacted epoxy group is too small to make the resinous material cross-linked and cured in reasonable degree under a practical baking condition.

The reaction of the amine with the epoxy group may be carried out by heating and agitating the already obtained solution of the copolymer with the addition of the amine. The reaction temperature is preferable in the range of 50° to 120° C. If it is lower than 50° C., the progress of the reaction will be so slow as to required a long time. When it is higher than 120° C., the cross-linking (side reaction) will become unnegligible.

The resin having reacted with the amine is dissolved or dispersed in water in which an organic or inorganic water-soluble acid has been dissolved. In such case, if the solvent used in the copolymerization and the subsequent reaction with the amine is miscible with water, it is not necessary to remove the same beforehand. After the acid is added in advance into the resin solution and is well mixed, water may be gradually added or, after the acid is dissolved in water, the solution may be added into the resin solution. Usually, the resin solution is considerably high in the viscosity so that it will be easier in mixing to add water into the resin solution than to add the resin solution into water.

As examples of the organic acid, there can be enumerated formic acid, acetic acid, propionic acid, lactic acid, malonic acid, tartaric acid and citric acid. If desired, a mixture of two or more of them or a mixture with an inorganic acid can be also used.

Examples of the inorganic acid are hydrochloric acid, sulfuric acid and phosphoric acid.

The particular acid(s) to be used and the amount thereof are determined by the object of the use of the coating composition and therefore no specific range of the amounts can be defined. However, in general uses, it is preferable to use a lower monobasic acid comparatively high in the volatility such as formic acid or acetic acid in a range of the amount to perfectly neutralize the basic group (tertiary amine group) bonded in the resin to one-half the amount.

In the use of the thus obtained resin solution or dispersion as a coating composition, it is also possible to incorporate additives used in ordinary paints such as a pigment, filler and others. However, it is to be noted that, as the resin itself is basic and its aqueous solution or dispersion is acid in most cases, an additive unstable to acids and alkalis cannot be used.

The coating composition or paint according to the present invention can be applied to any metal, wood and other objects by utilizing any of such coating methods as brushing, spraying, roller painting and dipping. However the most preferable use utilizing its features is a cathodic electrodeposition coating on metal products. As pointed out before when the cathodic electrodeposition coating is effected the article to be coated is used as the cathode and therefore the metal forming the body of the article and/or forming the pretreated surface layer (plating, phosphate protective layer, or the like) would be not dissolved out or eroded during the electrodeposition, and an excellent resin coating film is obtained. Particularly, the electrodeposition with the present coating composition is preferable particularly to a white or pastel colored finishing of iron products and a transparent finish of chromium-plated products and aluminum products.

The present invention will be explained more concretely with the following examples wherein all parts and percentages are by weight unless otherwise specified.

EXAMPLE 1

40 parts of isopropyl alcohol and 2 parts of azobisisobutylonitrile were put into a reactor provided with an agitator, reflux condenser, dropping funnel and thermometer and were heated. When the reflux started, a mixture consisting of 30 parts of glycinyl methacrylate, 5 parts of hydroxyethyl methacrylate, 30 parts of styrene, 35 parts of 2-ethylhexyl acrylate and 2 parts of azobisisobutylonitrile was fed over 2 hours and then the reaction was further continued in the reflux state for 3 hours to obtain a substantially colorless transparent copolymer solution. Then 5.3 parts of di-n-propylamine and 8.4 parts of isopropyl alcohol were added to this copolymer solution and the reaction was carried out at the reflux temperature for 3 hours. The obtained resin solution contained 65% nonvolatile component and had a viscosity of 48 poises at 25° C. Then 27 parts of 10% aqueous solution of acetic acid and 20 parts of ethylene glycol monobutyl ether were added to 154 parts of this resin solution, they were well mixed and then 466 parts of deionized water were gradually added and mixed therewith while agitating to obtain a semi-transparent stable aqueous dispersion containing 15% nonvolatile component.

EXAMPLE 2

A copolymer solution was obtained in the same manner as in Example 1 by using 40 parts of glycidyl methacrylate, 20 parts of methyl methacrylate and 40 parts of butyl acrylate as monomers. Then 16 parts of diisopropanolamine, 20 parts of isopropyl alcohol were added to this copolymer solution to react at the reflux temperature for 3 hours. The obtained resin solution contained 65% nonvolatile component and had a viscosity of 60 poises at 25° C. Then 50 parts of 10% aqueous solution of phosphoric acid and 40 parts of ethylene glycol monobutyl ether were added to 154 parts of this resin solution, they were well mixed and then 756 parts of deionized water were gradually added to be mixed therewith, to obtain a colorless transparent aqueous solution containing 10% nonvolatile component.

EXAMPLE 3

A copolymer solution was obtained in the same manner as in Example 1 by using 20 parts of glycidyl methacrylate, 20 parts of styrene, 20 parts of methyl methacrylate and 40 parts of 2-ethylhexyl acrylate as monomers. Then 5.4 parts of piperidine and 8.4 parts of isopropyl alcohol were added to this copolymer solution to react in the same manner as in Example 1. The obtained resin solution contained 65% nonvolatile component and had a viscosity of 68 poises at 25° C. Then 20 parts of 10% aqueous solution of hydrochloric acid and 40 parts of ethylene glycol monobutyl ether were added to 154 parts of this resin solution, they were well mixed and then 786 parts of deionized water were gradually added to dilute the solution to obtain a stable dispersion which contains 10% nonvolatile component and which is white-turbid but in which no separation and setting occurred.

EXAMPLE 4

A copolymerization was carried out in the same manner as in Example 1 by using 30 parts of glycidyl methacrylate, 20 parts of styrene, 10 parts of methyl methacrylate and 40 parts of ethyl acrylate as monomers. Then 3.9 parts of N-methylethanolamine and 8.0 parts of isopropyl alcohol were added to the copolymer to react in the same manner as in Example 1. The obtained resin solution contained 65% nonvolatile component and had a viscosity of 73 poises at 25° C. Then 42 parts of 10% aqueous solution of malonic acid and 30 parts of ethylene glycol monobutyl ether were added to 154 parts of this resin solution, they were well mixed and then 607 parts of deionized water were gradually added to dilute the solution to obtain a semi-transparent stable dispersion containing 12% nonvolatile component.

EXAMPLE 5

A reaction was carried out in the same manner as in Example 1 by adding 5.4 parts of morpholine and 8.4 parts of ethylene glycol monobutyl ether to the copolymer solution obtained in Example 4. The obtained resin solution contained 65% nonvolatile component and had a viscosity of 68 poises at 25° C. Then 25 parts of 10% aqueous solution of formic acid were added to 154 parts of this resin solution, they were well mixed and then 654 parts of deionized water were gradually added to dilute the solution to obtain a colorless transparent aqueous solution containing 12% nonvolatile component.

EXAMPLE 6

This example explains that if a secondary amine is used in an amount over 0.8 equivalent per equivalent of the epoxy group in the copolymer, the obtained coating composition cannot form a film cured satisfactorily under a practical baking condition.

40 parts of ethylene glycol monobutyl ether and 2 parts of azobisisobutyronitrile were put into the same reactor as in Example 1 and were heated to reach 85° C. Keeping the charge at this temperature, a mixture consisting of 30 parts of glycidyl methacrylate, 20 parts of styrene, 10 parts of methyl methacrylate, 40 parts of butyl acrylate and 2 parts of azobisisobutyrobitrile was continuously added there to over 2 hours and then the reaction was further continued at the same temperature for 3 hours to obtain a transparent copolymer solution. Then 13 parts of diethanolamine and 17 parts of ethylene glycol monobutyl ether were added to the copolymer solution to react at 90° C. for 3 hours, and a resin solution (6-A) containing 65% nonvolatile component was obtained. To 144 parts of the same copolymer solution above, 20 parts of diethanolamine and 20 parts of ethylene glycol monobutyl ether were added to react at 90° C. for 4 hours, and then was obtained a resin solution (6-B) containing 65% nonvolatile component. The amount of diethanolamine used in the resin solution 6-A and 6-B was 0.59 and 0.90 equivalent per equivalent of epoxy group originally present in the copolymer, respectively. Two coating compositions were obtained by slowly adding 62 parts of an aqueous solution of 10% propionic acid to 154 parts each of the resin solutions 6-A and 6-B, mixing thoroughly, and then diluting with water to 25% nonvolatile content. They were spread on glass panels, which were then air-dried for 20 minutes and baked at 180° C. for 30 minutes to obtain clear coating films. The film obtained from the resin solution 6-A was hard and stiff, not hurt by scratching with finger-nail and not affected by rubbing with xylene-soaked gauze. While, the film obtained from the resin solution 6-B was soft, easily scratched with finger-nail and abraded soon by rubbing with xylene-soaked gauze.

EXAMPLE 7

40 parts of rutile type titanium dioxide pigment were dispersed into 667 parts of the aqueous resin solution obtained in Example 1 and the dispersion was diluted with 267 parts of deionized water to obtain a white water-dispersed coating composition. This paint was used as a cathodic electrodeposition bath. Electrodeposition was conducted under 120 volts for 2 minutes by using a stainless steel plate as an anode and an iron-phosphate treated steel plate as a cathode to deposit a resinous film on the cathode. After being rinsed with water, the film was baked at 180° C. for 30 minutes to obtain a smooth glossy coating film about 20 microns thick. No coloring caused by the dissolving out of the surface of the object was observed. The film had such favorable properties as shown in Table 1.

Control 1

An aqueous dispersion of a white paint was prepared from 137 parts of a commercial cationic water-soluble resin A (73% nonvolatile component, a solution in isopropyl alcohol, a base value 0.54 milliequivalent/g. viscosity 27 poises at 30° C.), 40 parts of rutile type titanium dioxide pigment, 3.6 parts of acetic acid and 752.4 parts of deionized water.

This paint was electrodeposited on an iron phosphate treated steel plate in the same manner as in Example 7 and the formed film was baked at 180° C. for 30 minutes. The obtained film was about 20 microns thick and was insufficiently cured and unfavorable in the properties as shown in Table 1.

Control 2

An aqueous dispersion of a white paint was prepared from 125 parts of a commercial anionic water-soluble resin B (80% nonvolatile component, a solution in ethylene glycol monobutyl ether, an acid value 1.2 milliequivalents/g., viscosity 95 poises at 30° C.), 40 parts of rutile type titanium dioxide pigment, 9.6 parts of triethylamine and 758.4 parts of deionized water.

This paint was electrodeposited on an anode under 150 volts for 2 minutes by using an iron phosphate treated steel plate for the anode and an untreated steel plate as the cathode. The coating film obtained by baking the electrodeposited coating after rinsing with water was about 20 microns thick and was favorable in the properties as shown in Table 1 but was recognized to be colored by the dissolving out of the surface of the object.

Table 1

|  | Example 7 | Control 1 | Control 2 |
| --- | --- | --- | --- |
| Coated film appearance | Favorable | Favorable | A little colored |
| Pencil hardness | 2H | F | 2H |
| Ericksen slow penetration 7 mm | Nothing wrong | Cracked and peeled | Nothing wrong |
| Impact test with 500 g., 50 cm. | ″ | ″ | ″ |
| Salt-spray test for 96 hours | Blistering and rusting within 1 mm from the cutting | Blistering and rusting on the entire surface | Blistering and rusting within 2 mm from the cutting |

EXAMPLE 8

The aqueous solution of the paint in Example 2 was electrodeposited on a cathode under the conditions of 80 volts for 1 minute by using a carbon rod as an anode and a chromium-plated steel plate for the cathode. The electrodeposited coating was rinsed with water and then baked at 180° C. for 30 minutes to obtain a transparent smooth colorless film about 10 microns thick. This film had favorable properties as shown in Table 2.

Control 3

An aqueous solution of a clear paint was obtained from 200 parts of a commercial cationic water-soluble resin C (50% nonvolatile component, a solution in isopropyl alcohol and water as neutralized with formic acid, viscosity 9 poises at 25° C.) and 800 parts of deionized water.

This paint was electrodeposited on a chromium-plated steel plate in the same manner as in Example 8 and the deposited film was baked at 180° C. for 30 minutes. The obtained film was about 10 microns thick and was transparent and smooth as in Example 8 but was unfavorable in the hardness and corrosion resistance as shown in Table 2.

Control 4

An aqueous solution of a transparent paint was obtained from 125 parts of the same commercial anionic water-soluble resin B as in Control 2, 9.6 parts of triethylamine and 865.4 parts of deionized water.

This paint was electrodeposited under 80 volts for 1 minute by using a chlorium-plated steel plate as an anode. The formed film was rinsed with water and then baked at 180° C. for 30 minutes. The obtained coating film was about 10 microns thick, was colored to be greenish by containing chromium dissolved out during the electrodeposition, was cloudy and had no clear transparency.

Table 2

|  | Example 8 | Control 3 | Control 4 |
| --- | --- | --- | --- |
| Film appearance | Favorable | Favorable | Colored and cloudy |
| Pencil hardness | 2H | HB | 2H |
| Boiling water immersion for 2 hours | Nothing wrong | Blistering in 30 minutes | — |
| CASS test (continuously for 96 hours) | Nothing wrong | Blistering in 24 hours | — |
| Cross-hatch | 100/100 | 100/100 | — |

EXAMPLE 9

The water-dispersible paint obtained in Example 4 was electrodeposited under the conditions of 100 volts for 3 minutes on a cathode i.e. pure aluminum plate (1S—½H) or anticorrosive aluminum alloy plate (528) which had been degreased with a solvent and then etched with an alkali. A stainless steel plate was used as an anode. The formed film was rinsed with water and was then baked at 170° C. for 20 minutes to obtain a smooth transparent colorless coating film about 20 microns thick. It was of a pencil hardness of 2H, was nothing wrong in such tests as CASS test for 72 hours and immersion in 1% NaOH for 72 hours and in 5% $H_2SO_4$ for 24 hours.

What we claim is:

1. An aqueous thermosetting coating composition suitable for electrodeposition onto the surface of an article used as a cathode and comprising an aqueous solution or dispersion of a resinous material and an organic and/or inorganic acid, said resinous material being prepared by reacting (i) a secondary amine with (ii) epoxy groups pendant from a main chain of a copolymer of 5–50% by weight of an ethylenically unsaturated monomer containing epoxy groups and 50–95% by weight of one or more of vinyl or acrylic unsaturated monomers which do not contain epoxy groups and which are copolymerizable with the ethylenically unsaturated monomer, wherein said vinyl or acrylic unsaturated monomers are selected from the group consisting of styrene, substituted styrenes, vinyl esters of alkanoic acids containing 2–18 carbon atoms, acrylonitrile, methacrylonitrile, 1–18 carbon atoms-containing alkyl esters of acrylic or methacrylic acid, 2–4 carbon atoms-containing hydroxy alkyl esters of acrylic or methacrylic acid, and dialkyl esters of $\alpha,\beta$-unsaturated dibasic acids, the amount of the secondary amine being 0.1–0.8 equivalent per 1 equivalent of epoxy groups contained in said copolymer.

2. A coating composition as claimed in claim 1 wherein the epoxy-containing ethylenically unsaturated monomer is selected from glycidyl acrylate and glycidyl methacrylate.

3. A coating composition as claimed in claim 1 wherein the secondary amine is a bisalkanolamine.

4. A coating composition as claimed in claim 1 wherein the acid is a mixture of an organic acid and inorganic acid.

5. A coating composition as claimed in claim 1, which further contains a water-miscible organic solvent.

* * * * *